United States Patent
Boccadoro et al.

(10) Patent No.: US 10,814,417 B2
(45) Date of Patent: Oct. 27, 2020

(54) METHOD FOR MACHINING AND INSPECTING OF WORKPIECES

(71) Applicant: Agie Charmilles SA, Losone (CH)

(72) Inventors: Marco Boccadoro, Verscio (CH); Alessandro Giusti, Massagno (CH); Luca Maria Gambardella, Tradate (IT)

(73) Assignee: Agie Charmilles SA (CH)

( * ) Notice: Subject to any disclaimer, the term of this patent is extended or adjusted under 35 U.S.C. 154(b) by 271 days.

(21) Appl. No.: 15/817,744

(22) Filed: Nov. 20, 2017

(65) Prior Publication Data
US 2018/0147645 A1 May 31, 2018

(30) Foreign Application Priority Data
Nov. 26, 2016 (EP) .................................... 16200826

(51) Int. Cl.
*B23H 1/02* (2006.01)
*B23Q 17/24* (2006.01)
(Continued)

(52) U.S. Cl.
CPC .............. *B23H 1/02* (2013.01); *B23H 11/00* (2013.01); *B23Q 17/249* (2013.01);
(Continued)

(58) Field of Classification Search
CPC .... B23H 11/02; B23H 11/00; B23Q 17/2471; B23Q 17/249; G01B 11/303
(Continued)

(56) References Cited

U.S. PATENT DOCUMENTS 6,184,924 B1 * 2/2001 Schneider ............... B21B 38/00
348/92
8,891,852 B2 * 11/2014 Eames ............... G06K 9/00624
382/141
(Continued)

FOREIGN PATENT DOCUMENTS

| EP | 1918054 A1 | 5/2008 |
| EP | 2132524 B1 | 10/2016 |
| KR | 101675532 B1 | 11/2016 |

OTHER PUBLICATIONS

Extended European Search Report dated May 9, 2017 for Application No. 16200826.2 (6 pages).

*Primary Examiner* — Lien M Ngo
(74) *Attorney, Agent, or Firm* — Harness, Dickey & Pierce, P.L.C.

(57) ABSTRACT

A method for the machining of workpieces (11) and inspection of the processed workpiece surface in a machine tool (1), preferably a die sinking electrical discharge machine. The method uses at least one machining process interruption during which the processed surface of the workpiece (11) is inspected. Within said machining process interruption, at least one image of the processed workpiece surface is captured on the machine tool (1) by means of a digital camera (12). The images are processed by one or two pattern recognition algorithm (PRA D, PRA S), which were previously trained to determine the surface characteristics such as roughness parameters, functional surface features and/or characteristic defects of the processed workpiece surface captured on that at least one image. The determined surface characteristics are used to resume the processing of the workpiece surface with or without adjusting the processing parameters.

18 Claims, 10 Drawing Sheets

(51) Int. Cl.
*G01B 11/30* (2006.01)
*B23H 11/00* (2006.01)
B23Q 3/157 (2006.01)
B23H 1/00 (2006.01)

(52) U.S. Cl.
CPC ........ *B23Q 17/2471* (2013.01); *G01B 11/303* (2013.01); B23H 1/00 (2013.01); B23Q 3/157 (2013.01)

(58) Field of Classification Search
USPC ..... 219/69.17, 68, 69.1, 69.11; 348/92, 125, 348/128
See application file for complete search history.

(56) References Cited

U.S. PATENT DOCUMENTS

| | | | |
|---|---|---|---|
| 2004/0223053 A1* | 11/2004 | Gladnick | G01N 21/8806 348/79 |
| 2006/0104734 A1* | 5/2006 | Mathis | B23B 39/04 408/236 |
| 2010/0132910 A1 | 6/2010 | Rosenthal et al. | |
| 2010/0260378 A1* | 10/2010 | Noy | G01B 11/24 382/103 |
| 2013/0203320 A1 | 8/2013 | Ghalambor | |
| 2016/0334777 A1* | 11/2016 | Sato | B23Q 17/0909 |
| 2017/0017226 A1* | 1/2017 | Yamazaki | B23Q 17/2471 |
| 2017/0151634 A1* | 6/2017 | Witney | B23K 9/167 |

* cited by examiner

Ra = 1.26 μm    RSm = 78 μm

Ra = 1.26 µm    RSm = 188 µm

Ra = 1 μm

Ra = 1 μm

Fig. 8
Fig. 9
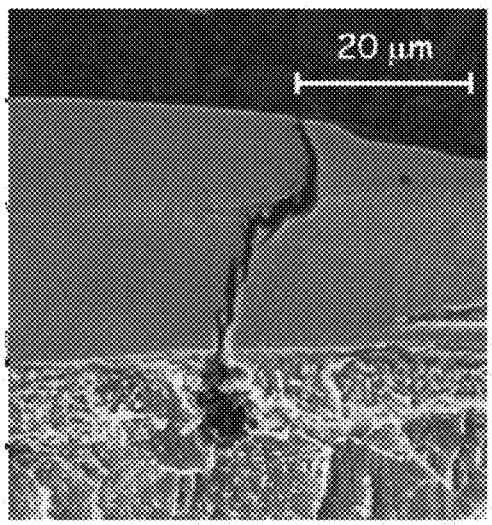

METHOD FOR MACHINING AND INSPECTING OF WORKPIECES

CROSS-REFERENCE TO RELATED APPLICATION

This application claims the benefit and priority of European Patent Application No. 16 200 826.2, filed Nov. 26, 2016. The entire disclosure of the above application is incorporated herein by reference.

TECHNICAL FIELD

The invention relates generally to a machine tool, and more specifically to an improved machining method including the characterization of a machined surface based on an image thereof. The image is captured in situ meaning on the machine tool during a machining process interruption. The surface characteristics are evaluated by means of a previously trained pattern recognition algorithm.

BACKGROUND OF THE INVENTION

The result of the machining of a part on a machine tool is a workpiece with a specific geometry, but also with specific surface characteristics. The surface characteristics of the workpiece become in most cases very important properties of said workpiece. In particular, the process of die sinking electric discharge machining (EDM) allows reproducing a shape in a workpiece by impressing the geometry of a negative shaped electrode.

In order to achieve the material removal, a series of sparks is carried out between tool electrode and workpiece, leaving on the latter a more or less rough surface. As mentioned, this surface is very important, since in most die sinking processes, the produced workpiece is a mold which is used as a tool of an injection molding process, to produce objects out of plastic or metal in large quantities, thus copying the surface structure of the mold.

The surface characteristics may be determined by esthetical reasons or by functional reasons, or both. The die sinking process produces a very homogeneous, basically isotropic machined surface. The process can be adapted to produce for instance surfaces that ease the unmolding process, so that the final product is more easily and quickly removed from the mold, and without damaging said product during the unmolding process.

In other cases the processed workpiece is a final part that can be used directly or with minimal additional processing, like e.g., orthopedic implants. Here an appropriate surface can ease after the surgical implantation the bone growth on the implant.

Therefore, an indispensable acceptance criterion for any processed workpiece is the achievement of the demanded surface characteristics.

According to current practice, at the end of the machining process the workpiece is most often removed from the EDM machine, cleaned and dried and then it is measured by means of a roughness measuring device and by means of a coordinate measuring machine (CMM).

However, if the measured surface roughness or a dimension does not match the requirements, there is no way of correcting the error, also in case of palletized workpieces. This is due to the fact that the exact repositioning of workpiece and electrode, and recreating the microscopic gap conditions which are required to resume machining is in many cases impossible. This results in costs that can become very important, according to the type, size and complexity of the mold.

Although non-contact surface inspection systems have been introduced about 30 years ago, tactile instruments are widespread. In practice, the roughness is mostly measured with stylus-type profile measuring instruments. The surface characteristics are measured by a linear scan or sometimes by several parallel scans close to each other. A measurement of the entire surface is impossible or obtainable only with big efforts.

Here the features measured are: the arithmetic average of the roughness profile Ra, the maximum height of the roughness profile Rz, the mean width of profile elements RSm, and the like, according ISO 4287. Such products are manufactured e.g., by Taylor Hobson Ltd., Leicester, England. The cost of such measuring instruments is quite substantial. While portable roughness measuring instruments by which the part can theoretically be measured in situ are available, these instruments are rarely applicable, due to the small size of parts, the need to prepare the measuring surface on board of the machine or due to inaccessibility of the processed area in situ, etc.

A further problem is that, being EDM a thermal process, micro cracks, burns, pitting and other defects can occur on the machined surface. These defects are not identified by the mentioned conventional instruments, and yet they can have fatal consequences, when machining parts for the medical or aerospace fields, since they reduce the lifetime of the part.

Although conventional roughness measuring instruments provide profile amplitude parameters, profile spacing parameters and hybrid parameters, they are not able to safely identify a functional structure or more generically a particular physical property of a surface. In this context the term "functional structure" means a geometric feature of the surface which provides a particular physical property such as: superhydrophobic-, oleophobic-, antibacterial properties, etc. This kind of surface can be obtained intentionally by laser processing or by EDM machining.

Makino Milling Machine Co. Ltd, Japan, and Alicona Imaging GmbH, Raaba, Austria have addressed this problem by integrating a sophisticated measuring device on a machine tool. The workpiece can be inspected on board of the EDM machine (in situ), without unclamping the workpiece, thus maintaining exact positional relation between workpiece and electrode. If required, the machining process can be resumed after the measurement. The InfiniteFocus measuring device by Alicona is an optical instrument which is based on the focus variation method (www.alicona.com/products/infinitefocus).

The optical system of Alicona comprises a digital microscope which executes a vertical scan of the cavity to be inspected in steps of 2300 nm down to 10 nm. The system has a very small depth of focus, thus only the edges at a certain vertical position are sharp with each scanning step. The sharp areas of the image in a plane are identified and stacked to a three-dimensional representation of the cavity. The InfiniteFocus system which is also described in EP-2132524-B1 provides a very accurate illustration of the topography of the cavity. The acquired topography can be processed providing dimensional values and areal roughness values of the selected area. It is to be noted that InfiniteFocus requires a remarkable computing power to process the images and get the topography in reasonable time. Moreover, the process of acquiring a given location requires multiple images and stage motions, and is therefore time consuming.

Due to the size of the focus variation microscope and the need keep the machining area free in operation and to protect the microscope itself, said measuring device is placed on a separate motorized vertical stage, parallel to the quill of the EDM machine.

The drawback is the very high cost of the measuring device itself, and its implementation within the machine tool that makes it unaffordable for most users. Another drawback is, that the disclosed apparatus only carries out the standard measurements (determining the parameters Ra, Rz, Rmax, Sa, Sq, Sz . . . ) and provides a 3D topography, but is unable to measure functional surfaces in the wide sense. Moreover, acquiring images that cover a large area may be very time consuming due to the multiple images and stage motions required to acquire each given location.

Thus, there is a need for an efficient and affordable on board measuring system by which the surface characteristics including possible defects can be determined in situ on the machine tool.

SUMMARY

One aspect of the present invention is an improved machining method in which the surfaces produced by electrical discharge machining or by another machining process are characterized by a digital camera based measurement that takes an image of the processed surface, and analyzes said 2D image in order to estimate the surface characteristics. Such analysis is performed by a pattern recognition algorithm, which takes as input an image of the surface and produces as output an estimation of the surface characteristics.

In a preferred embodiment of the invention, the pattern recognition algorithm implements machine learning techniques; such pattern recognition algorithm is previously trained on a training dataset, which consists in a list of reference images of surfaces whose surface characteristics are known.

Here a training dataset is determined beforehand. The training dataset comprises at least an image of each of a plurality of reference surfaces, and, a surface characteristic of each said reference surfaces which has been determined using a reference measuring equipment.

A pattern recognition algorithm is then automatically trained by means of the training dataset, i.e., the above mentioned images of reference surfaces and the measured surface characteristics which are associated to each said image. Once the pattern recognition algorithm is trained it is ready to be used to estimate the surface characteristics of a newly produced surface. An image of a machined surface is captured by means of a digital camera mounted on the machine tool, directly in situ. The image is processed by means of the pattern recognition algorithm which provides the estimate of the surface characteristics.

Note that, depending on the specific machine learning algorithm implemented, the training dataset may not be needed anymore, that is, the images must not be stored for using the algorithm on the machine.

In another embodiment of the invention, the pattern recognition algorithm compares the image of the processed surface to the images of the surfaces existing in the training dataset, and determines the best matching surface among those.

In a further embodiment of the invention, the one or more predefined training datasets and/or said one or more pattern recognition algorithms are stored in a machine tool control unit of the machine tool or remotely. If stored remotely, the dataset(s) is accessible to a machine tool control unit of the machine tool by means of a network.

The inventive solution is based on the consideration that a machined surface achieves a desired technical or aesthetical effect if the entire surface meets the requirements. For instance a functional surface on a workpiece is provided by the collectivity of functional structures on it. Thus the measure must be based on the integral observation and not on a line measure.

The optical device used can be e.g., a camera comprising a CCD-sensor, for instance a product from Conoptica AS, Klaebu, Norway (www.conoptica.com). Any digital camera with sufficient resolution can be used to capture the image of the processed surface.

Preferably the digital camera is fixedly or removably mounted inside the machine tool and communicates with the machine tool Computer Numerical Control (CNC) software.

In a preferred embodiment, the digital camera is equipped with a mechanical interface (or holder) by which it can be precisely, reproducibly and automatically manipulated, clamped to a chuck and removed therefrom, stored and generally managed like a standard tool, and controlled by the CNC of the machine tool. In the case of electric discharge machines said mechanical interface is a standard electrode holder of known type, comprising a drawbar and precise geometrical references, thus being fully compatible with the clamping system of the machine. In this way the optical axis of the digital camera is perfectly parallel with the Z-axis of the machine.

In a preferred embodiment the digital camera is automatically clamped on the chuck of the machine head instead of the tool to execute the in situ image acquisitions. In this way the entire machining area of the machine tool is accessible to the digital camera, and the distance between the optical axis of the digital camera and the Z-axis of the machine is minimized.

Alternatively the machine tool comprises a second chuck which is dedicated specifically to the digital camera, said second chuck being coaxial to the central chuck. The digital camera can still be manipulated automatically. In this way the digital camera is either (automatically) removed or left in place during the machining operation, according to specific needs and possibilities given by the configuration within the working area.

In a preferred embodiment the digital camera has a wireless power supply and communication, that is:
the digital camera has an integrated energy storage such as a rechargeable battery or a capacitor, providing operation autonomy for typically one hour, or the digital camera is inductively coupled with a part of the machine tool to continuously provide the energy to the digital camera, and/or
a wireless data transmission system.

In a preferred embodiment, the digital camera is stored in the magazine of an automatic tool changer (ATC) or a large capacity magazine, and manipulated by a gripper of the ATC, a handling manipulator or a robot. The storage for the digital camera may comprise a dedicated position with recharging means for the rechargeable battery or a capacitor of the digital camera. In another embodiment the digital camera is deployable by a plurality of machines of an automated manufacturing cell, having a shared robotic manipulator or other means by which the digital camera can be used with more than one machine. The machines can be same or different types of machine tool. The digital camera communicates with the control unit of the machine tool, with a cell computer or with a host. In this way the digital camera is used even more efficiently, and its cost is shared by all machines. Each machine which accesses the digital camera becomes also a surface inspection machine and dimensional measuring machine, being thus capable to inspect an actual work and take corrective action if needed and/or possible.

In operation, the digital camera is activated and positioned in the desired one or more positions to take one or more images, i.e., the imaged area of the machined surface. Each image is processed by a pattern recognition algorithm that was previously trained on training dataset.

Pattern recognition algorithms are known and state of the art. The field of pattern recognition is concerned with the automatic discovery of regularities in data through the use of computer algorithms and with the use of these regularities to take actions such as classifying the data into different categories. Pattern recognition algorithms and exemplary uses are described for instance in the book "Pattern Recognition and Machine Learning" by the author Christopher M. Bishop, Springer Publishing House, ISBN 978-0-387-31073-2.

The pattern recognition algorithm (PRA-S) estimates the relevant surface characteristics of the machined surface, such as (but not limited to):
  Profile roughness parameters (Ra, Rz, Rmax, RSm)
  Areal roughness parameters (Sa, Sq, Sz)
  Specific features of functional surfaces, such as super hydrophobicity For each of the surface characteristics that can be estimated given one camera image, the algorithm in PRA-S may produce one of the following two outputs:
  a single value, which describes the average surface characteristic over the whole surface area visible in the input image.
  a 2D matrix of values, which corresponds to a map that describes the value of the surface characteristic in different parts of the imaged area. For example, this map may be a 10×10 matrix, corresponding to a regular 10×10 grid subdivision of the imaged area. In each cell of the matrix, the estimated surface characteristic in the corresponding part of the imaged area is reported.

In the case of EDM, laser machining and other thermal machining processes, the surface of a steel workpiece is modified due to the short heating and rapid cooling of a narrow area of the material, creating a so called heat affected zone (HAZ). The HAZ comprises: a top layer of the crater formed by resolidified material (white layer, recast layer) which has been affected in crystalline structure and to some extent in the chemical composition; an intermediate layer which has not been melted or vaporized by discharges, but has been modified in structure due to the rapid cooling; and a base material which has not been affected in crystalline structure. The depth of the HAZ depends on how deep the heat of the discharges can penetrate into the material; it is proportional to the energy of the discharge pulses, mainly by the current amplitude, current pulse duration, and pulse shape. White layer has an increased hardness and brittleness, possibly with micro-cracks. With state of the art EDM machines the HAZ is almost completely eliminated by progressively reducing the pulse energy to small values.

Further, the process condition of an EDM process may deteriorate producing defects such as arc spots and black spots (burns). This occurs with poor flushing conditions, notably with geometries having strong indentations and protrusions, large interelectrode areas, improper flushing flow, undersized interelectrode gap, etc. The dielectric cools the molten material ejected from the crater, which solidifies into small particles. If said particles are not effectively removed from the gap, their concentration can increase locally and subsequent discharges will occur at the same or similar place. Concentration of discharges may lead to the above mentioned defects. Indeed, EDM machines are able to discern a deteriorating process based on the process signals and discontinue bad discharges, and react e.g., by a flushing movement or by extending the pulse pause (see EP-1918054 which is hereby incorporated by reference).

Of course the problems described here above occur not only with a die sinking electric discharge machining process, but likewise with almost all machining processes. For instance a milling process may generate chatter marks, burrs, breakouts, micro-geometrical errors, etc.

Further, the base casting material may comprise various defects, such as inclusions, gas porosities, and other non-uniformities.

Above mentioned defects may cause shortened service life, premature failure of a component or simply cause the workpiece to be discarded for esthetical reason. It is thus desirable to identify and classify such defects, in situ. This would allow to take corrective action in the course of the actual manufacturing, reducing to a certain extent the post-processing of the workpiece.

The preparation of the machined surface in view of image acquisition should be as good as possible, i.e., machining residues (chips, erosion particles, or the like) and the processing fluid (dielectric, coolant, emulsion, or the like) must be removed with a surface cleaning process. If said cleaning process in not executed properly, machining residues may be present on the surface, and should be identified as residues and not as a surface defect.

Thus, beside the aforementioned pattern recognition algorithm for the estimation of profile and areal roughness parameters and specific features of functional surfaces (PRA-S), the method for machining according the invention further or alternatively comprises a pattern recognition algorithm (PRA-D) for the identification of defect patterns, in particular machining defect patterns, such pitting, cracks, burns and the like, but also material defect patterns emerging on the machined surface.

If a plurality of defects is identified as to be machining residues, it is thus possible to launch a cleaning cycle and to repeat the image grabbing on the processed surface.

The pattern recognition system is based on known machine learning algorithms. In a preferred embodiment, sophisticated algorithms are adopted to estimate the parameters of the imaged surfaces; a non-exhaustive enumeration of such algorithms includes: Nearest-Neighbor classifier, Nearest-Neighbor regressor, Single-Layer or Multi-Layer Neural Networks, Convolutional Neural Networks, Support Vector Machines (reference is made to the cited literature). These algorithms must be previously trained on a training dataset. Some of these algorithms operate on the images after numeric features relevant to the task have been extracted and computed from such images; other algorithms, such as convolutional neural networks, operate directly on the pixel values of the images and do not require to extract numerical features from the images.

In another embodiment, the pattern recognition algorithms searches the whole training dataset for the images that best match (according to some defined metric) the observed image, and returns as an estimate the parameters of the corresponding reference surface in the training dataset. Examples of such metric include (but are not limited to): sum of absolute differences pixel-by-pixel; sum of squared differences pixel-by-pixel; sum of squared differences after the best alignment is found among the new and reference images; euclidean distance in an high-dimensional feature space, where features are computed using the Local Binary Pattern descriptor or one of its variants; euclidean distance in an high-dimensional feature space, where features are computed using other texture descriptors.

Hereinafter the procedure for the acquisition of the training dataset is explained in detail.

The training dataset is acquired once for all in a laboratory setting during the development of the pattern recognition system. In particular, in order to build the training dataset, different reference surfaces (i.e., surfaces having different surface characteristics) are produced by means of the considered machining process using various workpiece materials, various tools, and various machining parameter settings (regimes). Each reference surface is then measured using a reference measuring equipment of known accuracy and uncertainty; precise values for all the relevant surface characteristics of each reference surface are therefore known. This procedure is carried out only once per pattern, so one can invest the needed time and means to describe in detail this surface that will be used as a reference surface for the estimation by pattern recognition of future machined surfaces.

Preferably, for each reference surface, one or more images are acquired with the same or a similar digital camera and in same or similar acquisition conditions that are implemented on board of a machine tool with the final pattern recognition system. In other words, the digital camera and the acquisition conditions used to take images of reference surfaces in the laboratory environment should be same or similar with those used by the pattern recognition algorithm on the machine tool in the workshop to estimate the characteristics of a certain machined surface. The acquisition conditions to be considered include in particular the light conditions of both, the controlled illumination of the reference/processed surface and the external illumination of the laboratory/workshop under which the images of the reference surface and the images of the processed surface are captured.

It is to be noted that a certain reference surface can be observed using different, well-defined light conditions so as to get more images about that surface, for instance by using a light ring comprising selectively addressable LEDs. Of course said well-defined light conditions must then be used also when grabbing the images of the processed surface to be inspected. In practice, the inventive system can implement one of two possible solutions to deal with a suitable lighting.

In one approach of the invention, one image is acquired for every position of interest of the reference surfaces and of the surfaces to be analyzed. This image is acquired using always the same lighting setup.

In another approach, multiple images (N) are acquired for every position of interest in the reference surfaces, and in the surface to be analyzed. For each image that is acquired, a different lighting setup is implemented using the controllable illumination subsystem (such as the ring of addressable LEDs cited above). The lighting setup associated to the 1st, 2nd, . . . Nth images acquired for a given position is determined in advance and is fixed. For example, the 1st image acquired for every given position may always be illuminated using only a single LED at the rightmost part of the illumination ring, whereas the 2nd image acquired for every given position may always be illuminated using all LEDs of the ring.

This results in a list of images of reference surfaces, whose surface characteristics are precisely known by reference measurements, e.g., obtained using reference measuring equipment, as the before-mentioned and known roughness measuring instruments of Taylor Hobson Ltd. The images of reference surfaces and associated characteristics measured before with a reference measuring equipment constitute the training dataset that is then used in order to automatically train, that is to tune the parameters of the pattern recognition algorithms used by the inventive system. The learning phase, i.e., the training of the pattern recognition algorithms is made once, preferably using a computer with superior processing power and possibly specialized hardware such as Graphics Processing Units (GPUs). Summarizing, the machining of the reference surfaces, determining the reference surface characteristics, grabbing of reference images, associating reference images to determined surface characteristics, and training of pattern recognition algorithms is done beforehand, once for all, in laboratory.

Once the training of the pattern recognition algorithm is completed, the system is ready to be used in the workshop, respectively by the end user. The acquisition of one or more surface images of the machined workpiece and estimation of one or more characteristics of that machined surface by the pattern recognition algorithms (hereinafter defined as measuring phase), may be executed either at the end of the machining of a cavity (nominal depth reached; target geometry reached), or at an intermediate machining depth, for instance one or more machining steps before the very last machining step. In this case, the machining process is intentionally paused to execute an intermediate measuring phase on the desired machined surface. If the estimation of the characteristics of the machined surface shows a non-conformity with the expected results, then modified machining parameters (regime) and/or modified target depth (or more generally the target geometry) are set to complete the cavity. The machining process is then resumed with the modified machining parameters respectively with the modified target depth. If a corrective action is not possible the control unit issues a warning message and/or initiates an exception procedure. Said exception procedure may comprise: stopping the machining process, the automatic documentation of the non-conformity, separation of the defective part from the good ones, etc.

The measuring phase may be executed upon request by the user or autonomously by the CNC, based on the programmed settings.

In a further embodiment, the digital camera is moved to one or more predefined positions of the workpiece surface, taking images at said predefined positions of interest. Alternatively, the digital camera is moved over an entire selected area or over the entire machined workpiece surface, e.g., in a wiping mode, taking a number of images of adjacent regions. Then images of adjacent regions are stitched together to provide an overall image of the selected area. The individual images are processed by using the first pattern recognition algorithm (PRA-S), or the second pattern recognition algorithm (PRA-D), or both. The respective estimates are presented, e.g., in a graph or diagram. The estimates may be further analyzed to determine averages, maxima, minima, etc. of selected values. Preferably the estimates, are superposed to the graphic representation of the current machining, emphasizing maxima, minima, defects, etc. In this way the user can easily correlate the estimates with the position within a machining.

It is to be noted that pattern recognition algorithm requires only a moderate processing power to estimate the characteristics of the machined surface, and that the estimation based on said algorithm is carried out in very short time. The required processing power is available with the control unit of a modern machine tool.

The invention provides a safe, economic and effective method to inspect the processed workpiece to guarantee that it is defect-free and has the required surface quality. The method identifies unacceptable surface characteristics, providing an invaluable early inspection means. Also, by adopting an intermediate inspection in the course of the actual machining the process, quality and process reliability is improved.

A simplifying factor for the surface analysis and for the application of corrective action is given by the fact, that modern machine tools are more and more controlled by expert systems that apply a pre-stored set of regimes for a given machining task. This enables also an unexperienced operator to achieve good results. Related to the invention, this has the effect that in most cases no other regimes are possible, and the pattern recognition system takes advantage of the input from the expert system about the expected surface quality, and thus has only a limited field to search.

Other features of the inventive method will become apparent to those skilled in the art from the following detailed description of embodiments and its accompanying drawings.

BRIEF DESCRIPTION OF THE DRAWINGS

Embodiments of the invention will now be described, by way of example, and with reference to the accompanying drawings, in which:

FIG. 8 is an image of a micro-crack in a surface FIG. 9 is an image of a burn in a surface

DESCRIPTION OF THE PREFERRED EMBODIMENTS

Figure 1A:
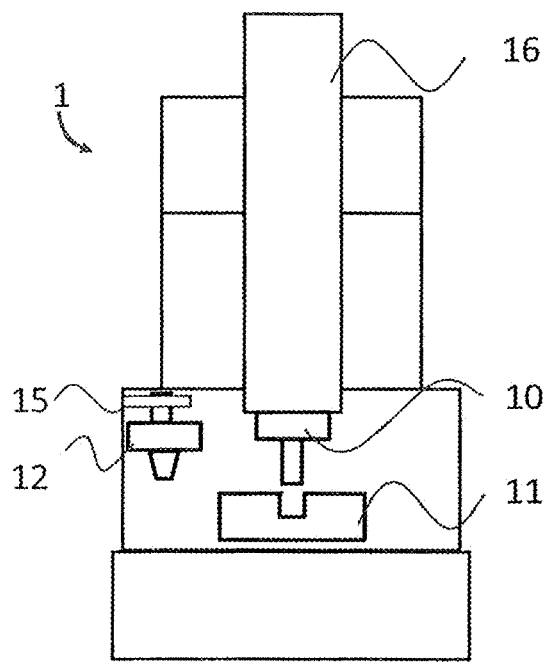
FIG. 1a is a simplified schematic illustration of an EDM machine with an optical measuring system stored in a rack
Figure 2:
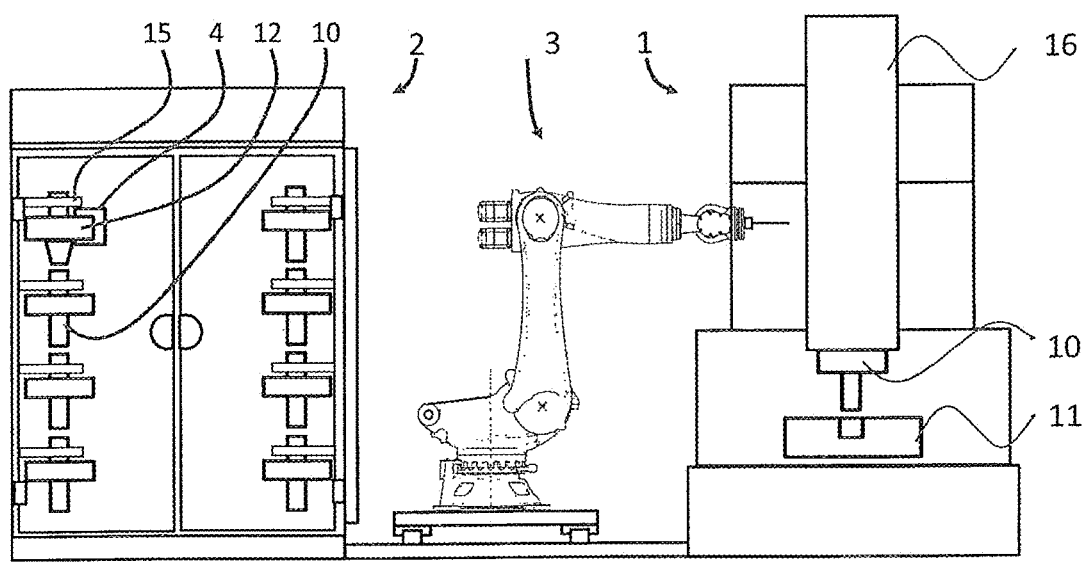
FIG. 2 is an illustration of a manufacturing cell with the optical measuring system placed in the rack

According to FIG. 1a, there is illustrated a die sinking electrical discharge machine 1, equipped with a digital camera 12. The optical axis of the digital camera is parallel with the Z-axis of the machine. The digital camera acquires a 2D-image of the machining surface by means of a 2D-digital camera or by a linear camera which acquires the surface while camera and surface move linearly in the orthogonal direction with respect to each other. The tool electrode 10 is clamped to the chuck on the machining head 16 whereas the digital camera 12 is safely stored in the rack 15 of an electrode changer, at the border of the machining area or outside thereof, in a large capacity magazine (cp. FIG. 2).

After an initial machining phase, the machining process is paused, the processing liquid is drained and the workpiece 11 is prepared for a measurement. The area of interest is cleaned and dried, either manually or automatically.

Figure 1B:
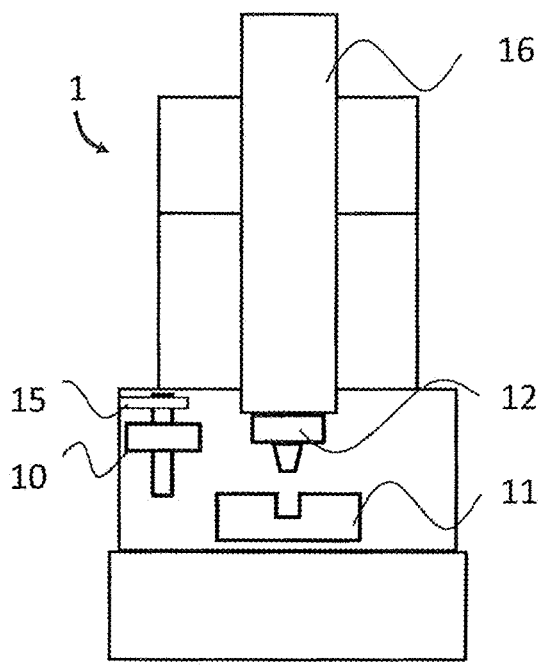
FIG. 1b is a simplified schematic illustration of the EDM machine with the optical measuring system placed in the machine head to take images of the surface

The tool electrode 10 is removed from its working position by means of the electrode changer, stored in rack 15 and replaced by the digital camera 12, which is now precisely clamped to the chuck on the machining head 16, as shown in FIG. 1b. A reclamping error of for instance 2 µm may normally occur with standard EDM electrode tool holders. Normally said error is not relevant for the present invention, however a correction cycle may be used to correct the offset of the optical axis of the digital camera with respect to the machine axis.

FIG. 2 illustrates a manufacturing cell comprising a die sinking electrical discharge machine 1, a large capacity magazine 2, a robotic manipulator 3 mounted on rails, and further machine tools or stations (not shown). As illustrated the digital camera 12 is stored in magazine 2, where it can be grasped by the robotic manipulator 3 and clamped on machine 1 or another machine. A particular position within magazine 2 is dedicated to the digital camera 12, said position comprising a charging unit 4 by which the battery of the digital camera is charged. The charging occurs either inductively or by physically contacting the digital camera.

Figure 3:
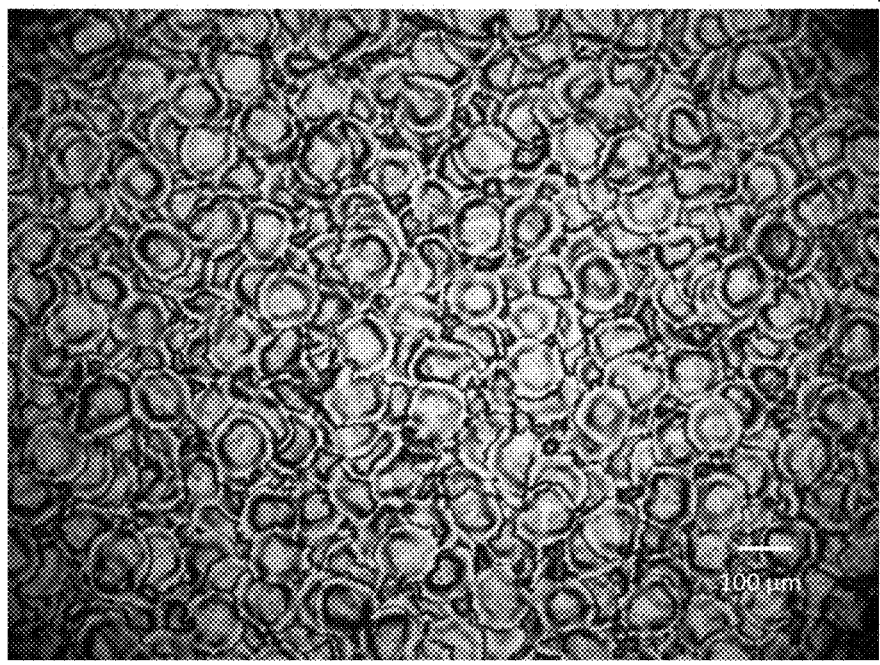
FIGS. 3-4 are images of workpiece surfaces processed by EDM with different machining parameters

The digital camera 12 takes one or more images of the surface of the workpiece 11. FIG. 3 shows a typical crater-landscape as generated by a die sinking process. The example has an Ra value of 1.26 µm, and RSm=78 µm, which may be a achieved in a finishing step. The machine memory, or a remote memory being accessible to the machine, contains a pre-trained pattern recognition algorithm. Such algorithm was previously trained using a training dataset that has been created in laboratory by machining a big number of reference surfaces and by measuring them with sophisticated reference instrumentation and obtaining several reference values, e.g., Ra, Rz, RSm, Rt, Sa, Sz for each specific machining condition, i.e. a regime, electrode pairing. The training dataset includes one or more images of each reference surface with one or more reference values associated to said one or more image of the reference surface.

Figure 4:

The superior value of the invention can be understood by observing FIGS. 3 and 4, having the same magnification. Although these two images look different, they have the same Ra value. Therefore describing the surface characteristics by only one surface characteristic value, e.g., Ra, might not be sufficient. A holistic approach that considers the totality of the surface, estimates not only the frequently used surface characterization parameters Ra, Rz, RSm, Rt, Sa, Sz, but is also able to provide a correct information about specific functional characteristics of said surface (e.g., hydrophobicity, oleophobic-, antibacterial).

Figure 5:
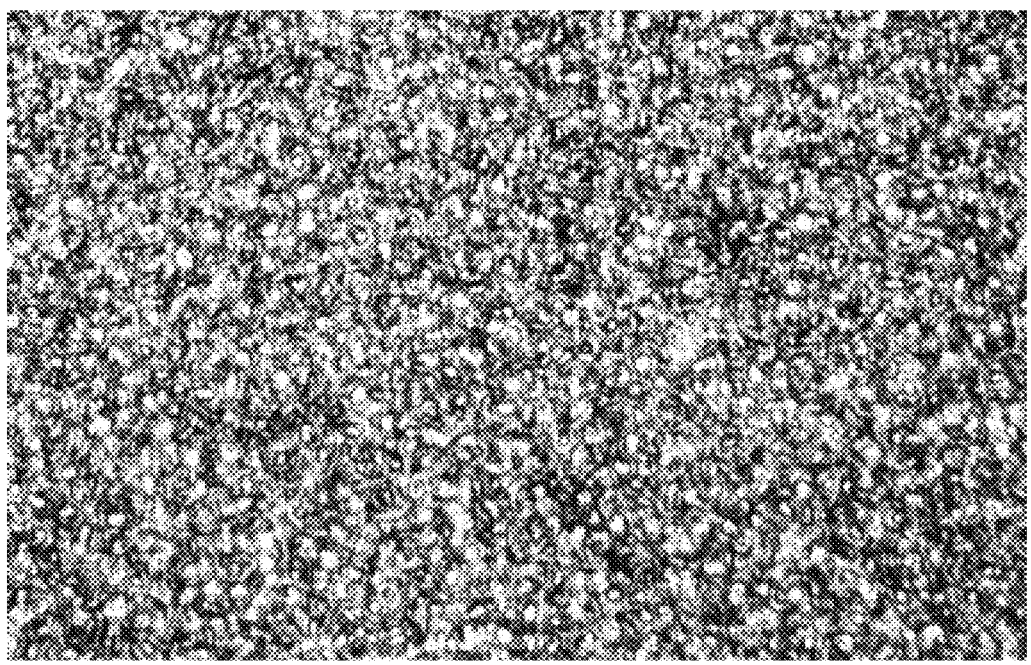
FIGS. 5-6 are images of workpiece surface processed by EDM with different parameters, captured by a digital camera in view of estimation of surface characteristics
Figure 6:
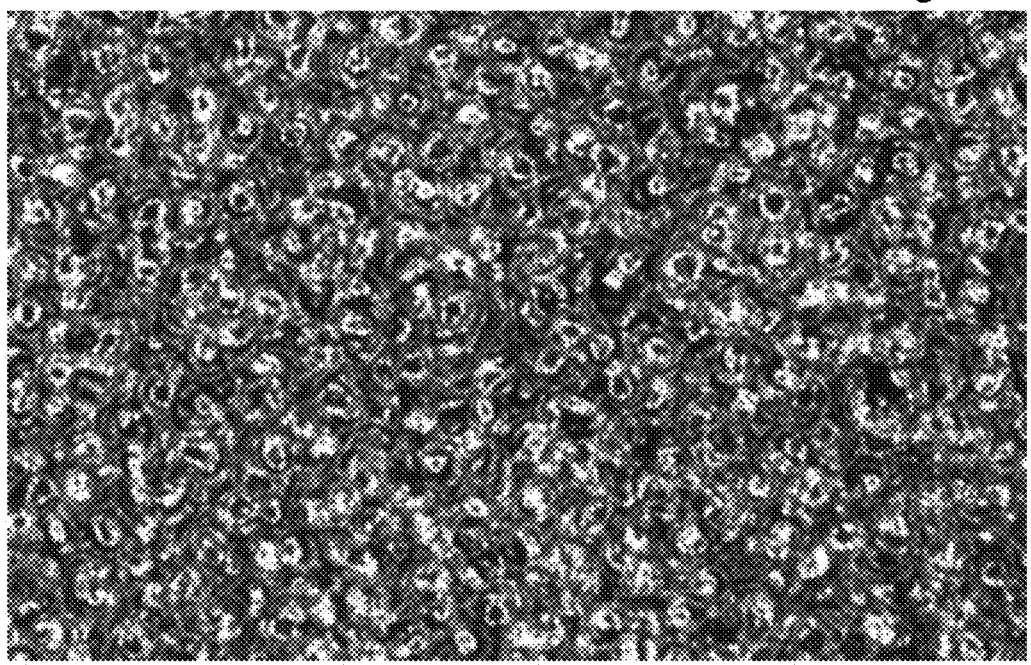

FIGS. 5 and 6 are further images of a surface which has been processed by EDM. The images are captured by a digital camera in view of the estimation of the surface characteristics. It is to be noted that the surfaces in FIGS. 5 and 6 have same arithmetic roughness Ra, but different width of profile elements RSm. By applying a pattern recognition algorithm according to the invention, the surface characteristics are easily and quickly estimated.

Figure 7:
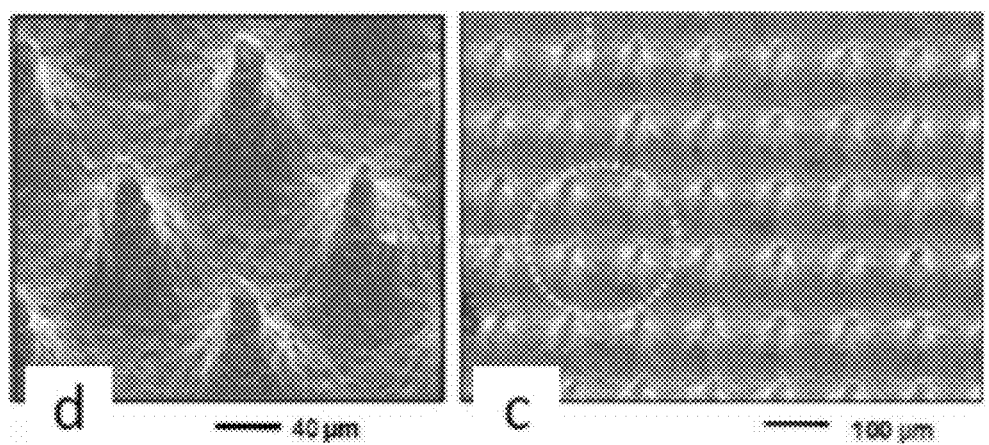
FIG. 7 is an image of a functional surface, having superhydrophobic properties

The FIG. 7 is an image of a functional surface, having superhydrophobic properties. Such surfaces have very complex structures, which are impossible to be described with the existing methods. The invention provides however a cost effective solution for the surface inspection, which is affordable by all machine tool users, whereas the sophisticated, very expensive measuring instruments necessary in the state of the art are out of reach for most of them.

FIG. 8 is a polished micrograph section of the machined workpiece, illustrating an important crack occurred in a recast layer. FIG. 9 is a picture of the machined workpiece showing burning marks. Such damages can occur for several reasons, e.g., with unsuitable processing parameters, but also due to difficult flushing conditions and the like. It is important to avoid such defects; should they occur anyway it is imperative to locate them safely.

Figure 10:
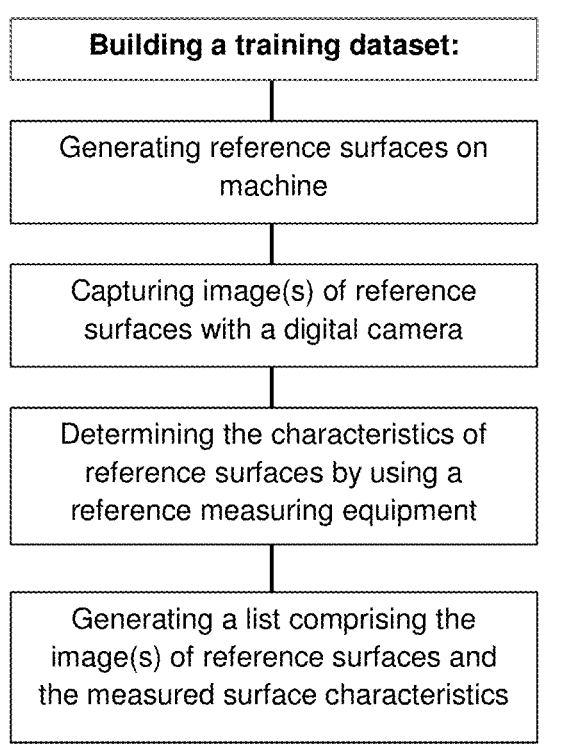
FIG. 10 is a flow chart of the training dataset building phase

The sequence to build up a training dataset for a pre-trained pattern recognition algorithm is illustrated in FIG. 10: Firstly, reference surfaces are produced with defined regimes. One or preferably more images of each of the reference surfaces are captured with a suitable digital camera and illumination setup, which are similar to those implemented in the machine. The surface characteristics of these surfaces are determined by using reference measuring equipment, for instance the mentioned and known roughness measuring instruments of Taylor Hobson Ltd. The images of the produced reference surfaces and the associated measured surface characteristics are listed in a dataset and constitute the training dataset that is then used in a learning phase to train the pattern recognition algorithms used by the invention.

Figure 11:
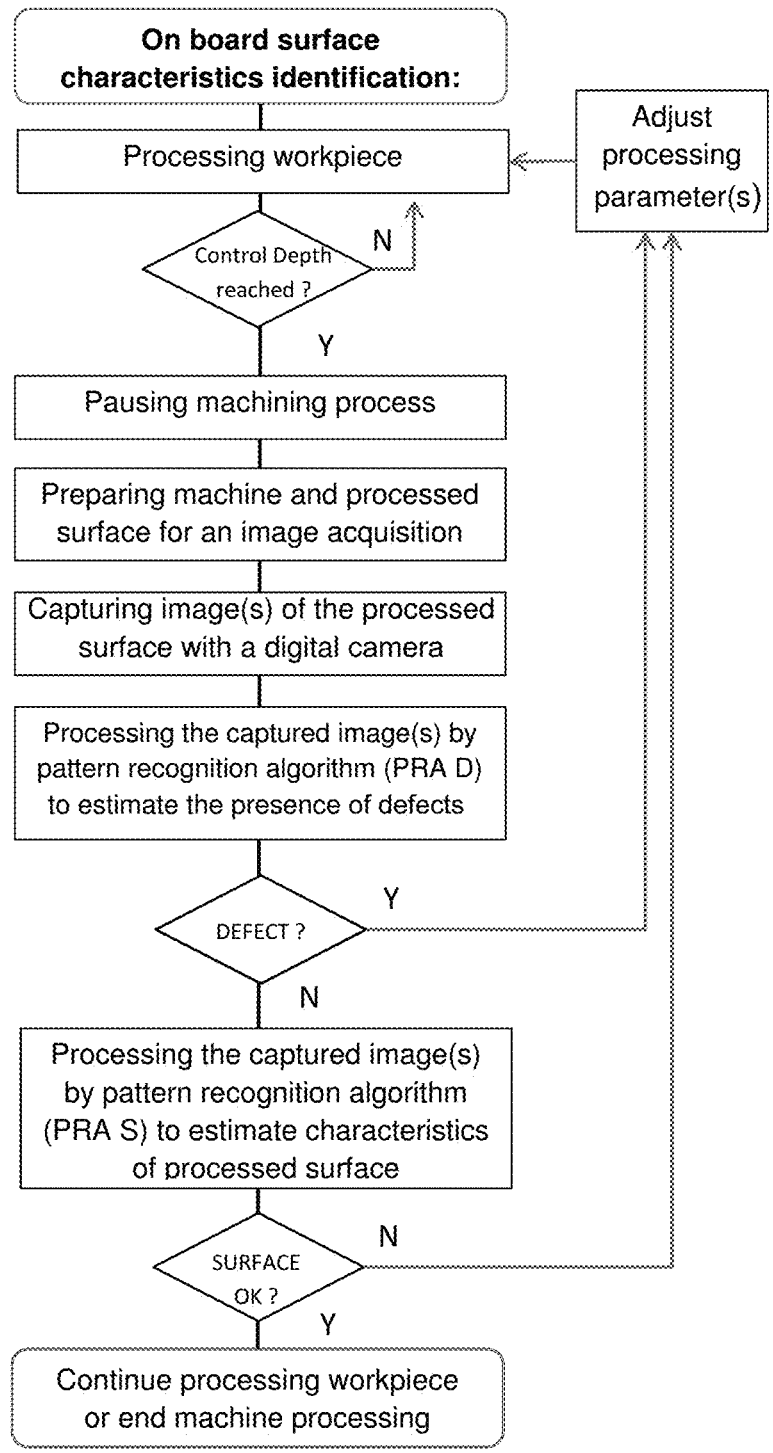
FIG. 11 is a flow chart of the algorithm for the estimation of defects and surface characteristics

A possible operational sequence of the inventive method is illustrated in FIG. 11 for a simplified machining task, i.e. erosion in Z axis (vertical). At a predetermined intermediate point the machining process is paused, and the workpiece 11 is prepared and an image is taken by means of the digital camera 12, as explained further above. A pre-trained pattern recognition algorithm estimates the surface characteristics or the presence of surface defects based only on the image of the machining surface. This can be done in one or—as FIG. 11 illustrates—in two steps: a first pattern recognition algorithm (PRA-D) estimates the presence of surface defects (see e.g., FIG. 8). A second pattern recognition algorithm (PRA-S) estimates the surface characteristics.

If the estimates determined by one or both pattern recognition algorithms PRA D and PRA S do not correspond to the desired value, the machine can adjust the processing parameters and resume therewith the machining process to correct this inaccuracy. Therefore it is advisable to check the surface when there is still room to allow an eventual correction. The above mentioned predetermined point of the machining is preferably a predetermined machining depth. For example, if the machining depth is Z=−10 mm, the check may be done at −9.95 mm, to allow 50 µm of processing by using a correction regime. Alternatively the above mentioned predetermined point of the machining may be a predetermined processing time, or a predetermined regime, or other criteria. If both pattern recognition algorithms PRA D and PRA S do not determine any surface defect or surface quality problem, the processing of the workpiece can continue or—in case the inventive measuring method is applied at the end of the machining process—the machining process is ended with that determination of the surface characteristic.

In a preferred embodiment the machine further comprises a means or method for the dimensional measurements, such as measurement of the effective (intermediate or final) depth of the cavity. For instance, the top surface and bottom of cavity may be touched by the electrode or by a touch probe, or, the digital camera used to take the images comprises a feature to determine the exact Z position of the surface and can thus be used to determine the depth of the cavity. In case of deviation with respect to expected intermediate depth values, the machining depth can be corrected by resuming the machining. The remaining amount of material is hereby identified more precisely in view of an eventual correction to achieve the desired surface characteristics respectively the desired roughness at the final workpiece surface.

As just explained, the inventive method includes in a preferred embodiment that a second pattern recognition algorithm (PRA-D) is used to detect, i.e., estimate the presence of a number of possible surface defects. These defects can be pitting, cracks, burns, etc. (see FIGS. 8 and 9).

Preferably, the second pattern recognition algorithm (PRA-D) to detect surface defects is applied before the pattern recognition algorithm (PRA-S) to estimate the surface characteristics. If a surface defect is determined by the second pattern recognition algorithm (PRA-D), the process parameters are adjusted accordingly.

This quality control is very important e.g., for the aerospace applications. Micro-cracks as illustrated in FIG. 8 can have catastrophic consequences. At least they reduce the lifetime of the parts, so that they have be avoided. By using the inventive method, defective workpieces can automatically be discarded by separating them from the good parts, and non-conformities are automatically documented.

The defect check can also be process driven, e.g., in case the acquired EDM machining process parameters signal a deteriorated or dangerous situation (e.g., short circuit or arcing rate). In such a case the machining process can be stopped and a defect check according to the inventive method can be carried out. Since the position of the electrical discharge can be detected in modern EDM machine tools, a map of the zones with deteriorated discharges can be generated. In this way the inspection according to the invention can possibly be reduced to the zones where such a deteriorated or dangerous situation has occurred.

Some minor defects, like burns (see FIG. 9), can be corrected by applying a reversed polarity (electrode negative, workpiece positive) and by generating very short pulses, or positive polarity and low frequency pulses. In this case, according to the invention, first the minor defects are removed, then the correct roughness is achieved as explained further above.

The invention addresses the specific deviations of the current machining with respect to target values and tolerances, thus providing an adaptive machining process.

The invention can be applied to most types of machine tools and machining operations of workpieces, such as electric discharge machines, laser processing machines, a grinding machine or milling machines.

The invention relates also to machine tools, which are accordingly equipped to apply the inventive method. Therefore prepared machine tools for the machining of workpieces include a computer numerical control system (CNC) for controlling the processing of a workpiece. The computed numerical control system (CNC) is equipped with an integrated inspection system for the determination of the surface characteristics and/or characteristic defects of the processed workpiece surface. The computer numerical control system (CNC) with its integrated inspection system machines and inspects the workpiece in accordance with the inventive method. The inspection system is equipped with a digital camera, preferably removable mounted inside the machine tool.

Preferably the machine tool is an electric discharge machine, a laser processing machine, a grinding machine or a milling machine.

In a preferred embodiment, the machine tool includes an associated tool magazine in which the digital camera is stored. Preferably, the digital camera is a wireless digital camera.

Further, the invention relates also to manufacturing cells including two or more of the inventive machine tools. The manufacturing cell includes a tool magazine, which is shared by the machine tools of the manufacturing cell. Preferably, the digital camera is deployable by a plurality of machine tools of said manufacturing cell. Most preferably the digital camera is store in the tool magazine and deployable by the machine tools of the manufacturing cell.

The present invention is not limited to the explicitly explained examples and embodiments. The illustrated alternatives are rather to be considered suggestions intended to motivate the person skilled in the art to implement the invention in a most favorable way.

REFERENCES 1 machine tool
2 tool magazine, electrode magazine
3 robotic manipulator, robot
4 charging unit
10 tool electrode
11 workpiece
12 digital camera
15 rack, tool holder
16 machining head

What is claimed is:

1. A method for machining a workpiece and inspecting a processed workpiece surface in a machine tool, the method comprising:
   machining the workpiece;
   interrupting the machining of the workpiece with at least one machining process interruption during which the processed surface of the workpiece is inspected;
   wherein during said machining process interruption at least one image of the processed workpiece surface is captured in situ by a digital camera, and that said at least one image is processed by a pattern recognition algorithm (PRA D, PRA S) which was previously trained by a predefined training dataset;
   wherein said predefined training dataset comprises one or more reference images of a plurality of reference surfaces, each reference image being associated to one or more known surface characteristics and/or to a known characteristic defect of a reference surface;
   wherein at least one surface characteristic of the processed workpiece surface captured on the at least one image, or the presence of one or more characteristic defects of the processed workpiece surface captured on the at least one image, is estimated by a pattern recognition algorithm (PRA D, PRA S), assigning the corresponding surface characteristic and/or the characteristic defects determined by the pattern recognition algorithm.

2. The method for machining of workpieces and inspection of the processed workpiece surface in a machine tool according to claim 1, the method comprising one or more pattern recognition algorithms, wherein:
   one pattern recognition algorithm (PRA-S) is trained to the estimation of at least one surface characteristic of the processed workpiece surface; and/or
   one pattern recognition algorithm (PRA-D) is trained to the estimation of the presence of characteristic defects on the processed workpiece surface.

3. The method for machining of workpieces and inspection of the processed workpiece surface in a machine tool according to claim 1, comprising one or more predefined training datasets, wherein said at least one predefined training dataset comprises a list with a plurality of records, whereas each record comprises
   a reference image and at least one known surface characteristics associated to said reference image; or
   a reference image and a known characteristic defect.

4. The method for machining of workpieces and inspection of the processed workpiece surface in a machine tool according to claim 3, wherein said one or more predefined training datasets and/or said one or more pattern recognition algorithms are stored:
   in a machine tool control unit of the machine tool; or
   remotely, and is accessible to a machine tool control unit of the machine tool by means of a network.

5. The method for machining of workpieces and inspection of the processed workpiece surface in a machine tool according to claim 1, wherein the pattern recognition algorithm PRA-S is trained to estimate at least one of the following surface characteristics:
   Profile roughness parameter (Ra, Rz, Rmax, RSm); or
   Areal roughness parameter (Sa, Sq, Sz); or
   Specific feature of a functional workpiece surface.

6. The method for machining of workpieces and inspection of the processed workpiece surface in a machine tool according to claim 5, wherein said specific feature of functional surfaces is associated to one of the following workpiece surface properties: superhydrophobic-, oleophobic-, antibacterial.

7. The method for machining of workpieces and inspection of the processed workpiece surface in a machine tool according to claim 1, wherein the pattern recognition algorithm PRA-D is trained to identify defects on the processed workpiece surface, the defects being one or more of: a pitting mark, a micro-crack, a burn mark, a chatter mark, a burr, a breakout, a micro-geometrical error, a material defect, a machining residue.

8. The method for machining of workpieces and inspection of the processed workpiece surface in a machine tool according to claim 1, wherein the processed workpiece surface is inspected within the machining process interruption of a current machining process, whereas said machining process interruption is:
   a machining process pause; or
   the end of the machining process.

9. The method for machining of workpieces and inspection of the processed workpiece surface in a machine tool according to claim 8, wherein the processed workpiece surface is inspected within a machining process pause, and that at least one characteristic of the machined workpiece surface which is estimated by the pattern recognition algorithm PRA-S and/or PRA-D and compared with a target characteristic, and that based on said comparison the machining process is either resumed, ended or aborted.

10. The method for machining of workpieces and inspection of the processed workpiece surface in a machine tool according to claim 8, wherein the machining process is resumed and that machining parameters are either left unaltered or changed in consideration of the estimate of pattern recognition algorithm (PRA-D) and/or with the estimate of the pattern recognition algorithm (PRA-S).

11. The method for machining of workpieces and inspection of the processed workpiece surface in a machine tool according to claim 9, wherein the processed workpiece surface is inspected within a process pause or upon process completion, and that at least one estimated characteristic of the machined workpiece surface is compared with a target characteristic, and that one or more of the following actions are taken:

the at least one estimated characteristic and comparison with the target characteristic is documented;

the workpiece is handled according to the result of the comparison as good or defective.

12. The method for machining of workpieces and inspection of the processed workpiece surface in a machine tool according to claim 1, wherein said machining process interruption comprises one or more cleaning and drying cycles in view of the image capturing with a digital camera, whereas the cleaning and drying cycle is repeated if the pattern recognition algorithm (PRA-D, PRA-D) estimates one or more defects as to be machining residues.

13. A machine tool configured to perform the method of machining the workpiece of claim 1, the machine tool comprising:

a computer numerical control system (CNC) configured to control the machine tool to machine the workpiece;

an integrated inspection system of the computer numerical control system (CNC) for the determination of the surface characteristics and/or characteristic defects of the processed workpiece surface; and the digital camera of the integrated inspection system that is removably mounted inside the machine tool;

wherein the machine tool is an electric discharge machine, a laser processing machine, a grinding machine or a milling machine.

14. The machine tool for the machining of workpieces according to claim 13, including an associated tool magazine, wherein the digital camera is a wireless digital camera, and that said wireless digital camera is stored in the tool magazine associated to the machine tool.

15. A manufacturing cell including more than two machine tools according to claim 13, the manufacturing cell further including a tool magazine shared by the machine tools of the manufacturing cell, wherein the digital camera is deployable by a plurality of machine tools of said manufacturing cell.

16. A method for machining a workpiece and inspecting a processed workpiece surface in a machine tool, the method comprising:

machining the workpiece;

interrupting the machining of the workpiece to inspect the workpiece for defects, the inspection including:

capturing an image of the processed workpiece surface of the workpiece in situ with a digital camera;

checking the processed workpiece surface for defect patterns by processing the image with a defect pattern recognition algorithm that was previously trained by a predefined defect pattern training dataset, the predefined defect pattern training dataset including one or more reference images of a plurality of reference surfaces, each reference image being associated with one or more known defect patterns including at least one of material defect patterns and machining defect patterns, the machining defect patterns including at least one of pitting, crack, burn, chatter mark, burr, breakout, micro-geometrical error, material defect, and machining residue;

if defect patterns are found in the processed workpiece, adjusting processing patterns of the machining to correct the defect patterns;

if no defect patterns are found, checking the surface characteristics of the processed workpiece by processing the image with a surface characteristics recognition algorithm that was previously trained by a predefined surface characteristics training dataset, the predefined surface characteristics training dataset including one or more reference images of a plurality of reference surfaces, each reference image being associated with one or more of the following surface characteristics: profile roughness parameters, areal roughness parameters, and functional surface features including hydrophobicity and antibacterial;

if the surface characteristics are outside acceptable parameters, adjusting processing patterns of the machining to bring the surface characteristics to within acceptable parameters; and if the surface characteristics are within acceptable parameters, ending the interruption of the machining.

17. The method according to claim 16, further comprising continuing with the machining of the workpiece if the surface characteristics are within acceptable parameters.

18. A method for machining a workpiece and inspecting a processed workpiece surface in a machine tool, the method comprising:

machining the workpiece;

interrupting the machining of the workpiece with at least one machining process interruption during which the processed surface of the workpiece is inspected;

wherein during said machining process interruption at least one image of the processed workpiece surface is captured in situ by a digital camera, and that said at least one image is processed by a pattern recognition algorithm (PRA D, PRA S) which was previously trained by a predefined training dataset;

wherein said predefined training dataset comprises one or more reference images of a plurality of reference surfaces, each reference image being associated to one or more known surface characteristics and/or to a known characteristic defect of a reference surface;

wherein at least one surface characteristic of the processed workpiece surface captured on the at least one image, or the presence of one or more characteristic defects of the processed workpiece surface captured on the at least one image, is estimated by a pattern recognition algorithm (PRA D, PRA S), assigning the corresponding surface characteristic and/or the characteristic defects determined by the pattern recognition algorithm; and resuming the machining of the workpiece after the processed surface of the workpiece has been inspected.

\* \* \* \* \*